US006811286B2

(12) United States Patent
Mateescu et al.

(10) Patent No.: US 6,811,286 B2
(45) Date of Patent: Nov. 2, 2004

(54) UNDERWATER LIGHTING FIXTURE WITH COLOR WHEEL AND METHOD OF CONTROL

(75) Inventors: Michael V. Mateescu, Los Angeles, CA (US); Kevin Potucek, Simi Valley, CA (US); Robert Bachman, Glendale, CA (US)

(73) Assignee: Pentair Pool Products, Inc., Moorpark, CA (US)

( * ) Notice: Subject to any disclaimer, the term of this patent is extended or adjusted under 35 U.S.C. 154(b) by 164 days.

(21) Appl. No.: 10/128,041

(22) Filed: Apr. 22, 2002

(65) Prior Publication Data

US 2002/0149941 A1 Oct. 17, 2002

Related U.S. Application Data

(63) Continuation of application No. 09/540,080, filed on Mar. 31, 2000, now Pat. No. 6,379,025.

(51) Int. Cl.[7] .............................. H02P 5/52; F21Y 9/10

(52) U.S. Cl. ......................... 362/293; 362/35; 362/101; 362/364; 318/62; 318/85; 318/102

(58) Field of Search .......................... 362/35, 101, 145, 362/158, 267, 293, 310, 16, 17, 96, 147, 227, 234, 235, 236, 242, 243, 284, 296, 307, 311, 317, 319, 322, 323, 324, 277, 282, 327; 318/34, 41, 49, 50, 53, 59, 62, 66, 85, 101, 102, 103, 272, 277, 278, 248, 696; 315/32, 363

(56) References Cited

U.S. PATENT DOCUMENTS 2,848,671 A * 8/1958 Mc Donald .................. 318/85
2,943,185 A * 6/1960 De Mott ..................... 362/101
3,104,815 A * 9/1963 Schultz ........................ 362/35
3,769,503 A 10/1973 Kim
3,949,213 A 4/1976 Paitchell
3,967,170 A * 6/1976 MacDonald et al. .......... 318/85
4,617,498 A * 10/1986 Ruppert ....................... 318/85
5,394,309 A * 2/1995 Brown ........................ 362/101
6,002,216 A * 12/1999 Mateescu .................... 315/158
6,379,025 B1 * 4/2002 Mateescu et al. ........... 362/293

* cited by examiner

*Primary Examiner*—Thomas M. Sember
*Assistant Examiner*—Ismael Negron
(74) *Attorney, Agent, or Firm*—Pearne & Gordon LLP

(57) ABSTRACT

An underwater lighting fixture adapted for installation in a lamp receiving recess in the wall of a swimming pool. The fixture includes a lamp housing having a pair of reflector-mounted incandescent lamps mounted therein. A plate having a pair of a apertures is mounted in the housing with the apertures mounted in alignment with the lamps. A pair of secondary reflectors are mounted to face the plate apertures and are provided with light-transmitting portals. A color wheel having dichroic filter segments is mounted so that identically colored pairs of segments pass the portals when the color wheel is driven by a motor. The motor is controlled by a circuit by disconnecting power to an input of the circuit, reconnecting power to the input to control the motor to move at a first speed. The control circuit stops the motor when the driven element reaches an index position. After the step of reconnecting power and after a predetermined period of time, the control circuit controls the motor to move the driven element at a second speed.

12 Claims, 5 Drawing Sheets

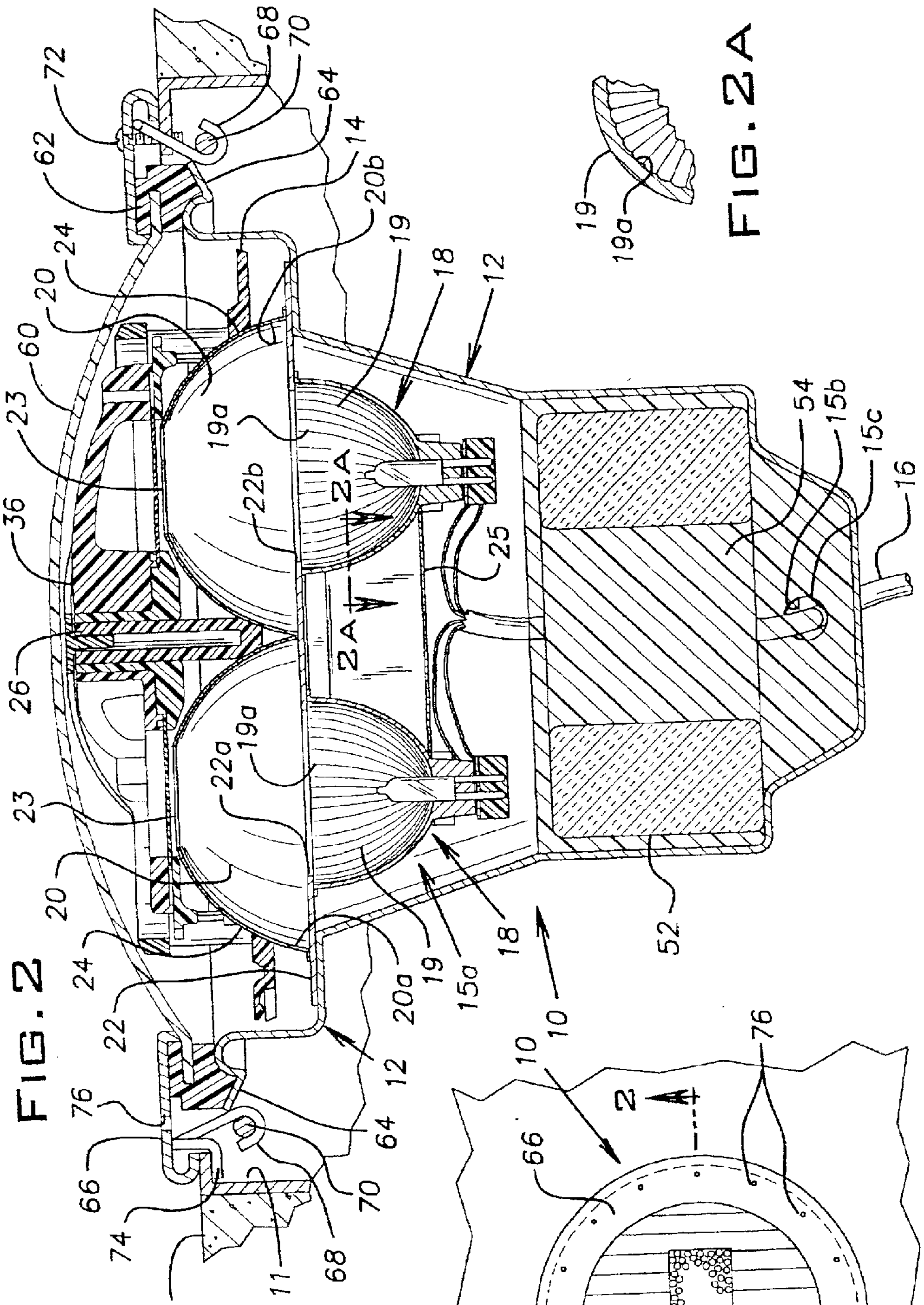
FIG. 2
FIG. 2A
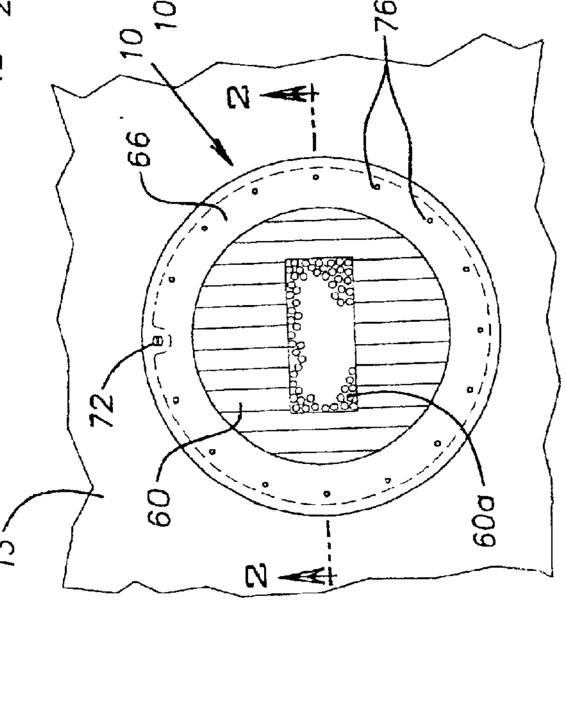
FIG. 1

FIG. 5
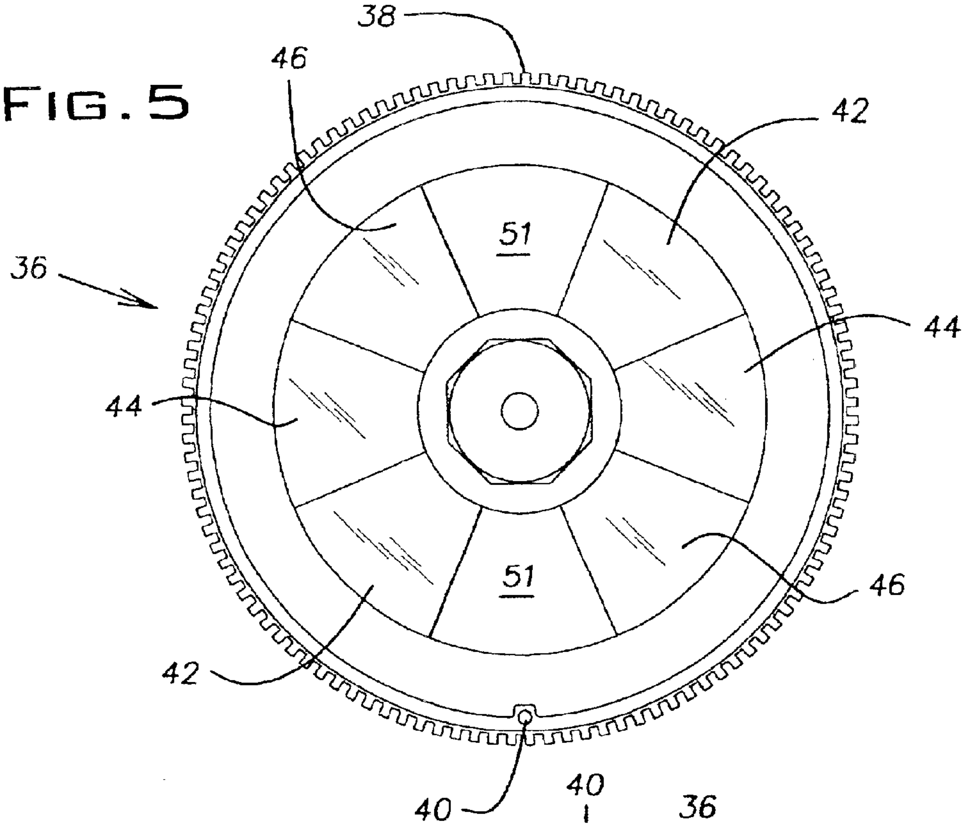
FIG. 6
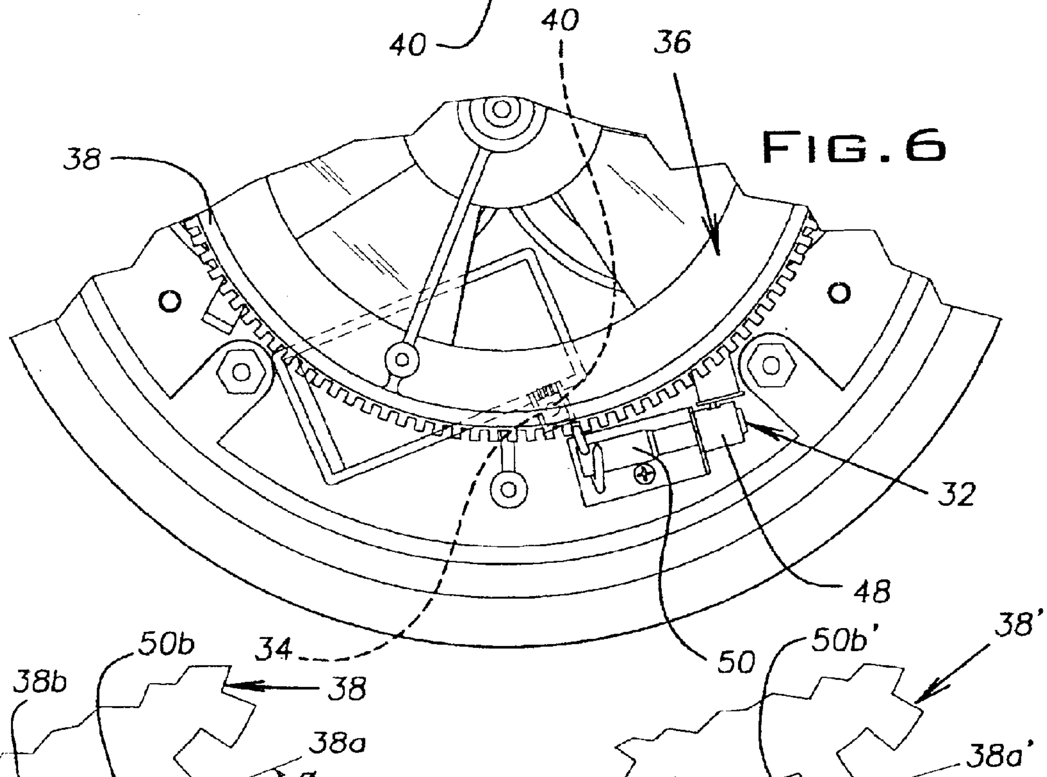
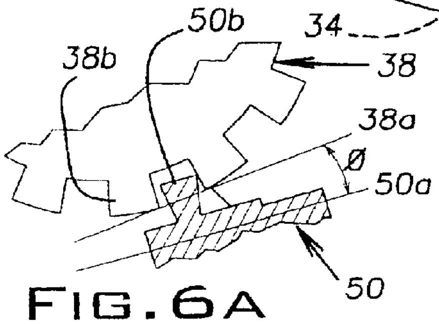
FIG. 6A
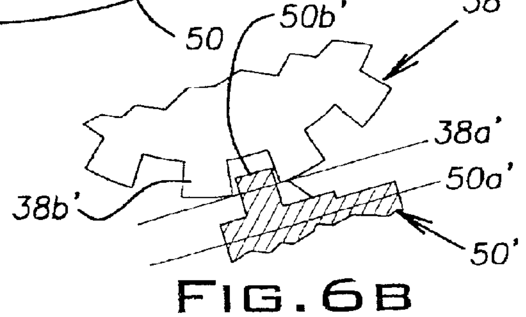
FIG. 6B

UNDERWATER LIGHTING FIXTURE WITH COLOR WHEEL AND METHOD OF CONTROL

FIELD OF THE INVENTION

The present invention relates generally to the field of illumination, and, more particularly, to a submersible color light. Although the present invention is subject to a wide range of applications, it is especially suited for use in a pool lighting system, and will be particularly described in that context.

BACKGROUND OF THE INVENTION

Pool lights illuminate the water at night for the safety of swimmers and for aesthetic purposes. The illumination emanates from underwater lights affixed to the wall of the pool. As used herein, a pool is used generically to refer to a container for holding water or other liquids. Examples of such containers are recreational swimming pools, spas, and aquariums.

To enhance the aesthetics, some current underwater pool lights use a transparent color filter or shade affixed to the front of the lens of the pool light to filter the light emanating from the lens of the pool light and thus add color to the pool. The color filters come in a variety of colors but only one of these color filters can be affixed to the pool light at a given time. Thus, the color of the pool stays at that particular color that the color filter passes. In order to change the color of the pool, the color filter must be removed from the pool light and a different color filter installed across the lens of the pool light.

As a alternative to these fixed colored filters, a system has been devised whereby a rotating wheel having filters of several colors is provided, such as the system disclosed in U.S. Pat. No. 6,002,216 and incorporated herein by reference. In this arrangement, white light is provided from a single source to at least one fiber optic lens through an optical fiber. Colored light is emitted from each fiber optic lens by passing white light through the color filter wheel which is selectively rotated by a motor in the illuminator. The color of light emitted by multiple illuminators is synchronized by independent circuitry within each illuminator that responds to digital signals in the form of manually interrupted supply current.

However, fiber optic underwater illumination systems have several limitations that lead to the need for the present invention. The first is that their performance is relative to the skill of the installer. Only a well-trained technician is capable of installing a fiber optic system that can adequately illuminate a swimming pool. The availability of qualified training is limited thus the availability of trained installers is limited. Rushed fiber termination or fiber termination performed by an untrained installer can result in more than a 30% decrease in fiber optic system performance and can ultimately result in a costly failure of the total fiber optic system.

The second disadvantage of underwater fiber optic illumination is the limited amount of light delivered to the pool. This results from the light attenuation over distance that is inherent in the fibers' composition and the inefficiencies of focusing available light into the optical fiber at the light source.

A further drawback of fiber optic underwater illumination is in the possibility of retrofitting the millions of existing pools having traditional submersible incandescent lighting fixtures. The feasibility of installing adequately sized fiber optic cable in the existing conduits is limited. These conduits are commonly ½ inch in diameter and are rarely over one inch in diameter. The minimum conduit diameter to carry a single fiber optic cable capable of delivering minimally acceptable light to a pool is one inch and the recommended size is 1½ inches.

An additional limitation of fiber optic systems is the additional cost of the materials and professional installation.

The alternative to colored fiber optic systems, providing colored lenses to submersible incandescent lighting fixtures, can be troublesome as well. These fixtures can be supplied with a colored glass lens to deliver that specific color to the pool. These colored glass lenses are typically limited to how richly they can color the light because the darker (or richer) the lens color, the more light in the form of heat that is trapped in the lens and the fixture. As the lens becomes too hot by absorbing too much light it can break due to thermal expansion or due to the differences in thermal expansion on the hot interior surface of the glass and the cool exterior surface that is in contact with the water. Further, as a result less light is emitted and it may be insufficient to illuminate the pool.

As an alternative to glass lenses, snap on or twist lock plastic colored lenses can be installed over an existing clear glass lens for a considerably simpler method to changing the color of the pool lighting. This method still requires physically lying or kneeling on the edge of the pool an reaching below the water to remove the existing plastic lens and then reaching again into the water to install the next colored plastic lens. Economical transparent colored plastics are also inefficient light transmitters reducing the amount of colored light reaching the pool.

A need therefore exists for pool lights that can easily replace existing self-contained, incandescent lighting fixtures, but having synchronized color wheels without the additional cost of installing fiber optic cables and other drawbacks associated with fiber optic underwater illumination systems. Further, a need exists for colored lenses to be used with incandescent fixtures that do not trap excessive amounts of light and heat.

SUMMARY OF THE INVENTION

The present invention, which tends to address these needs, resides in a pool lighting system. The pool lighting system described herein provides advantages over known pool lighting systems in that it is less difficult and less costly to install than existing pool lighting systems that can provide a variety of synchronized colors to the pool water and can be easily retrofitted to existing incandescent lighting systems.

According to the present invention, each lighting fixture of the pool lighting system comprises a color wheel and an incandescent lamp, wherein the lighting fixture places the color wheel at a predetermined position after a predetermined time subsequent to an alternating-current (AC) source of power being applied to the lighting fixture.

Further, according to the present invention, an underwater lighting fixture includes a lamp housing which is adapted to be installed in a lamp receiving recess in the wall of a swimming pool. The housing has an interior cavity, an open mouth defined by a rim, and a rear opening. A plate is mounted within the housing and is transverse to a longitudinal axis of the housing. The plate has a pair of diametrically opposed openings. A pair of incandescent lamps are positioned at each of the plate openings on one side of the plate and each lamp is provided with a reflector directed toward its plate opening. Secondary reflectors are positioned on the other side of the plate so that the reflectors have mouths at one end which are directed toward the plate openings. Each secondary reflector has a portal at its other end which is directed toward the mouth of the housing. A color wheel which is mounted for rotation in the housing about the longitudinal axis of the housing. The color wheel has a plurality of radial dichroic filter segments which are arranged so that identically colored segments are diametrically opposed on the wheel. The wheel is driven by a motor to sequentially position successive filter segments over each reflector portal. A transparent cover is sealed to the open mouth of the housing and an electrical supply conduit extends through a fluid seal in the rear housing opening.

BRIEF DESCRIPTION OF THE DRAWINGS

FIG. 1 is an elevational view of a submersible lighting fixture mounted in a pool wall;

FIG. 2 is a cross-sectional view, the plane of the section being indicated by the line 2—2 in FIG. 1;

FIG. 2*a* is a cross-sectional view, the plane of the section being indicated by the line 2*a*—2*a* in FIG. 2;

FIG. 5 is a back plan view of the color wheel of the submersible lighting fixture;

FIG. 6 is a detail of the submersible lighting fixture illustrating the alignment of a sensor and a magnet disposed therein;

FIG. 6*a* is a detail of the engagement between a worm gear and a ring gear in the present lighting fixture;

FIG. 6*b* is a detail of the engagement between a conventional worm gear and a ring gear.

DETAILED DESCRIPTION OF THE INVENTION

Figure 3:
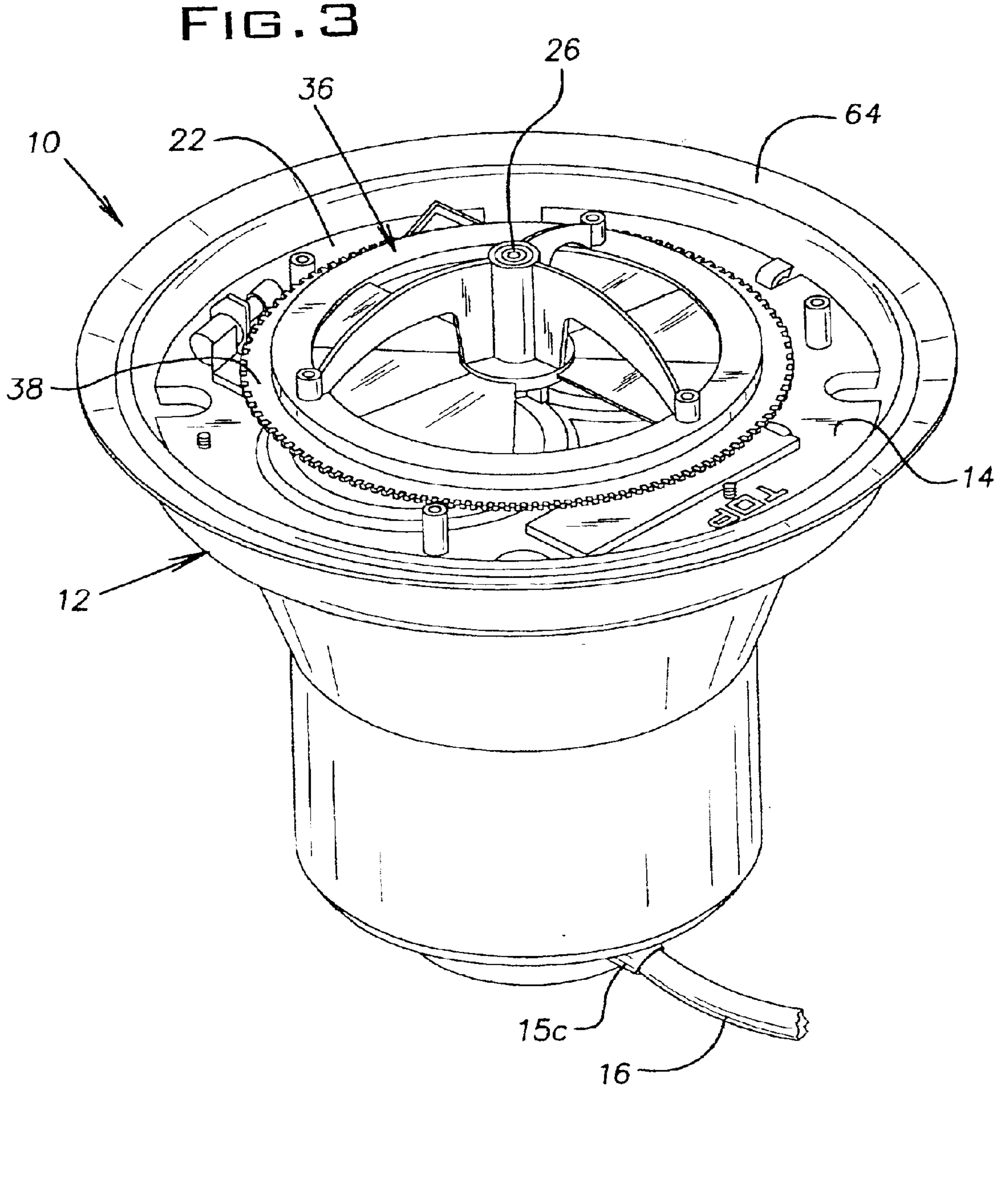
FIG. 3 is a perspective view of a submersible lighting fixture shown with its transparent cover removed.

As shown in the drawings, and with particular reference to FIGS. 1 and 2, the present invention is embodied in a submersible incandescent lighting fixture 10 comprising a housing 12 having an open mouth 15 and defining a cavity 15*a* with a rear opening 15*b*. A component tray 14 is mounted on the housing 12. The lighting fixture 10 is adapted to be mounted in a recess 11 in a wall 13 of a pool. A power cord 16 extends from the housing 12 through the opening 15*b* and is sealed by a grommet 15*c* to provide power to the lighting fixture 10.

Referring to FIG. 2, to provide light to a pool, the lighting fixture 10 further comprises two lamps 18 with integral dichroic-coated glass reflectors 19 having axial grooves 19*a* therein and two secondary reflectors 20 mounted to a copper plate 22, the plate 22 being mounted to the housing 12 and having a pair of diametrically opposed openings 22*a* and 22*b*. The secondary reflectors 20 extend through two circular passages 24 provided in the tray 14. The secondary reflectors 20 are provided with circular portals 23 to allow the passage of light emanating from the lamps 18. The portals 23 are relatively small in area compared to the openings 22*a* and 22*b* and bottom openings 20*a* and 20*b* in the secondary reflectors 20 are relatively large in area compared to the openings 22*a* and 22*b*.

The contact areas between the lamps 18, a copper plate retainer 25, the copper plate 22, and the metal housing 12 allow heat generated by the lamps 18 to be efficiently transferred to the housing 12 and dissipated into the pool water. Thus, the lighting fixture operates at a cooler temperature and the life of its components, including the lamps 18, is increased.

Figure 4:
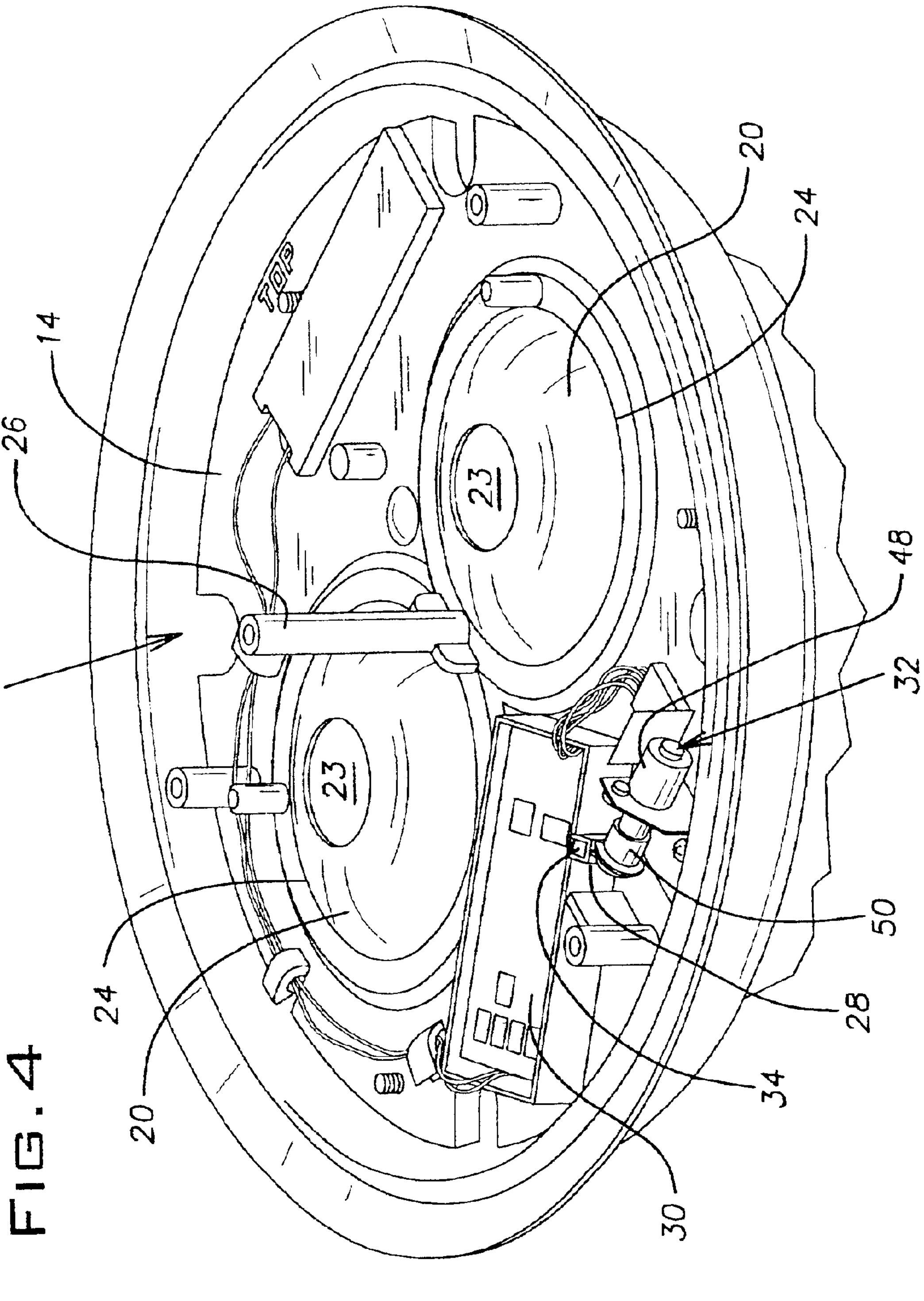
FIG. 4 is a fragmentary perspective view of the submersible lighting fixture shown with its transparent cover and color wheel removed.

Referring to FIG. 4, the tray 14 is further provided with a center post 26 and a sensor guide 28. Affixed to the tray 14 is a printed circuit board 30, a driver mechanism 32, and a sensor 34 extending from the circuit board 30 and disposed within the sensor guide 28.

Referring now to FIGS. 3–6, a color wheel 36 is mounted on center post 26. The color wheel 36 comprises a ring gear 38, a magnet 40, and three pairs of dichroic glass filters 42, 44 and 46, as best shown in FIG. 5. The color wheel 36 is disposed in front of the lamps 18 so that light emitted by the lamps 18 when energized, passes through the color wheel 36. Dichroic filters are used, as opposed to colored glass or other types of filters, because they allow the greatest amount of light to pass through, reducing the amount of light absorbed as heat and providing more intense colors. Except for the magnet 40 and filters 42, 44 and 46, all of the components of the color wheel 36 are made from a transparent, colorless material so as not to interfere with the emission of light from the lighting fixture 10.

The driver mechanism 32 is comprised of a stepper motor 48 and a worm gear 50 that rotate the color wheel 36 through a connection to the ring gear 38, a best shown by FIG. 3 and FIG. 5. Such a connection eliminates the need for a shaft connecting the color wheel 36 to the stepper motor 48, as in U.S. Pat. No. 6,002,216. Such a shaft would require tedious realignment each time a burned-out lamp needed to be replaced. The use of the worm gear 50 and ring gear 38 allow the entire color wheel drive train to be contained in front of the lamps Referring now to FIGS. 6*a* and 6*b*, a conventional worm gear 50' and ring gear 38' engagement is shown in FIG. 6*b*. In this arrangement, it is necessary for the worm gear 50' to be precisely aligned to a line 50*a*' being parallel to a line 38*a*' being tangent to the ring gear 38' at the point of engagement. In this conventional design, if the worm 50' is angularly misaligned, a tooth 50*b*' of the worm gear 50' may be unable to freely move within the space between teeth 38*b*' of the ring gear 38'. The present invention, in order to solve this problem of gear binding, provides the worm gear 50 with a slightly undercut tooth 50*b*, as shown in FIG. 6*a*. As will be appreciated by one of skill in the art, this undercut tooth 50*b* allows for a certain amount of angular misalignment, $\phi$, between the longitudinal center-line 50*a* of the worm gear 50 and a line 38*a* being tangent to the ring gear 38 at the point of engagement, without any binding occurring.

Referring again to FIGS. 3–6, as the color wheel 36 is rotated, the pairs of filters 42, 44 and 46 pass sequentially in front of the lamps 18, filtering the light emanating from the lamps 18. The filtered light is transmitted to the pool through a lens or transparent cover 60 mounted to the front of the housing.

The pairs of filters 42, 44 and 46 allow the passage of a specific wavelength of light: green, blue and red/magenta, respectively. A pair of openings 51 are also provided on the color wheel 36 to allow for the passage of white light. When a combination of two adjacent filters of different colors, or a filter and an opening 51, are simultaneously positioned over a single lamp 18, the light emitted from the lighting fixture 10 has the appearance of being a mixture between the two colors being passed through, the particular hue being determined by the relative proportions of light passing through each filter or opening 51. For example, the blue filter 44 and red/magenta filter 46 could be combined to produce light at nearly any hue of purple. The filters 42, 44 and 46 are sequentially arranged in spectral order, with green 42 isolated from red/magenta 46. Thus, rotation of the color wheel 36 gives the appearance of a subtle, nearly indistinguishable transition from one hue to the next.

It should be noted that the portals 23 provided between the lamps 18 and the color wheel 36 serve a variety of purposes. The portals 23 limit the light that is emitted to the area with the greatest flux density (the primary focus spot), minimizing the size of the dichroic filters 42, 44 and 46 and the color wheel 36 and thus reducing the cost and overall size of the lighting fixture 10. Additionally, it is necessary to mask the light emitted so that it does not pass through unintended adjacent filters. As will be appreciated by one of ordinary skill in the art, dichroic filters require light to strike them in a generally perpendicular fashion in order to produce predictable results. The farther in either direction from perpendicular that light strikes a dichroic filter, the greater the variance from the desired hue will the light be that passes through. Thus, the small size of the portals 23 is necessary to prevent scattered light from striking the dichroic filters at shallow angles and tainting the desired hue.

In the present embodiment the lamps 18 utilized are 75-watt, 12-volt lamps having integral reflectors. The lamps 18 are selected to have optimal characteristics, such that a sufficient amount of light can be generated but the lamps still have an acceptable life and efficiency. The filters 42, 44 and 46 and the openings 51 are arranged with bilateral symmetry on the wheel 36, such that the same filter/opening combination and proportion appears in front of each lamp 18 at any given moment.

To further enhance the efficiency of the lighting fixture 10, the use of secondary reflectors 20 allows much of the light that does not directly pass from one of the lamps 18 through the corresponding portal 23 to be reflected back into the primary reflector 19 and finally out through the portal 23. Thus, the secondary reflectors 20 take otherwise wasted light that is outside the primary focus spot and reflect it back to the primary reflectors 19 where it is then reflected forward to the useable primary focus spot.

Referring now to FIG. 6, the color wheel 36 is shown rotated such that the magnet 40 is aligned with the sensor 34. This alignment provides a magnetic indexing point, such that the sensor 34 is responsive to the position of the color wheel 36 and provides a reference position pulse indicating the color wheel is at a predetermined position when the magnet 40 passes over the sensor 34. The sensor 34 is a readily available magnetic field detector that generates a reference position pulse when in close proximity to the magnetic field generated by magnet 40.

Referring again to FIG. 2, the lighting fixture 10 is provided with an integral transformer 52 that converts alternating current line voltage into power suitable for the circuit board 30 and the stepper motor 48. The integral transformer 52 allows the lighting fixture 10 to easily replace existing 120 volt light fixtures with little effort and it avoids many of the problems associated with connecting a plurality of low voltage lighting devices to a single transformer, including the risk of overloading the transformer. Additionally, the integral transformer 52 allows the use of 12-volt lamps, since present technology limits viable, bright, compact, long-life lamps with integral reflectors to low voltage. A thermally conductive resin 54 secures the transformer 52 to the housing 12 and transfers thermal energy therebetween which is eventually dissipated by the housing 12 into the pool water.

The interior of the cavity 15*a* is sealed from fluid by the lens or transparent cover 60 and a sealing grommet 62. The grommet 62 is seated in a peripheral lip 64 of the housing 12 and is covered by a trim seal ring 66. The seal ring 66 has a plurality of depending hooks 68 which are pivotally connected to the ring 66 and which receive an annular tensioning wire 70. The wire is tensioned by a tensioning bolt (not shown) which, upon tightening, draws the hooks into contact with the lip 64 to compress the grommet 62. The sealed housing 12 is retained in the recess 11 by a screw 72 located at the top of the housing 12, as mounted in the recess 11, and by a tab 74 located at the bottom of the housing 12. The interior of the recess is flooded with water for cooling purposes by providing a plurality of openings 76 in the seal ring 66. The colored or white light admitted through the color wheel is further dispersed by a lens texture 60*a* molded into the cover 60.

A synchronization circuit is-provided on the circuit board 30. The circuit operates in a way that allows multiple light fixtures 10 to be synchronized without the need for additional wiring between units.

In the present invention, the synchronization circuit uses the 60 Hz alternating current supply voltage to generate a master pulse. Thus, the same master pulse is generated by every lighting fixture that is connected to the same power source. Accordingly, there are no slave units and no need for wiring from a master unit to slave unit in order to transmit the master reference signal to each slave unit.

The synchronization circuits are controlled by timed interruptions in the alternating current supply voltage. Each power interruption is used as a reference point by the synchronization circuits allowing all of the color wheels to be synchronized and the same accent color from each of the light fixtures to be provided to the pool water.

The synchronization circuit of each light fixture synchronizes the color wheel by controlling the driver mechanism to place the color wheel at a predetermined position subsequent to the alternating-current source of power being interrupted in a predetermined sequence. This assures that the color wheels are synchronized.

After a predetermined time, the synchronization circuits begin stepping the motors that rotate the color wheel. If the power to the light-fixtures is applied at the same instant, then each color wheel will begin stepping at the exact same time and the wheels will step at the same rate, being determined by the sine waves of the alternating—current source of power. Thus, the color wheels remain synchronized.

Figure 7:
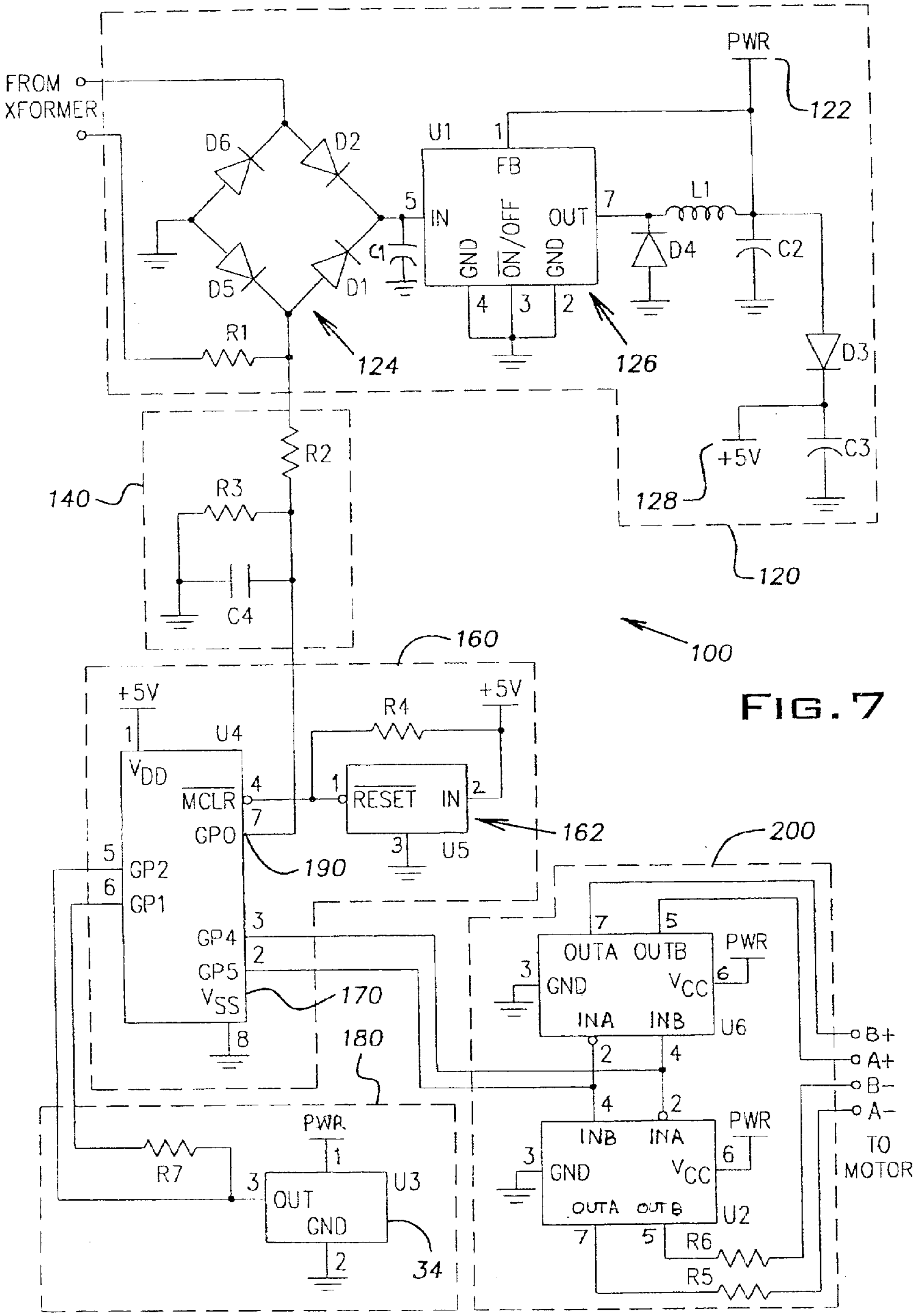
FIG. 7 is an electrical schematic of a synchronizer circuit of the lighting fixture.

Referring to FIG. 7, which is an electrical scheme of the present embodiment of a synchronizer circuit 100 according to the present invention, the synchronizer circuit 100 includes a power supply circuit 120, a filter 140, a control circuit 160, an index point sensing circuit 180, and a low-impedance output driver circuit 200.

A parts list for the synchronizer circuit 100 follows:

| Reference | Part Value | Part Number | Manufacturer |
|---|---|---|---|
| C1 | 47 μF/35 V | ECE-B1VFS470 | Panasonic |
| C2 | 100 μF/16 V | ECE-A1CFS101 | Panasonic |
| C3 | 220 μF/10 V | ECE-A1AFS221 | Panasonic |
| C4 | 1 nF | ECU-V1H102KBM | Panasonic |
| D1, D2, D5, D6 | — | DL4002 | Microsemi |
| D3 | — | DL4148 | Microsemi |
| D4 | — | SMB5817MS | Microsemi |
| L1 | 330 μH | 5800-331 | J.W. Miller |
| R1 | 2.2 Ω | — | — |
| R2, R3, R7 | 68 kΩ | ERJ-6GEYJ683 | Panasonic |
| R4 | 4.7 kΩ | ERJ-6GEYJ472 | Panasonic |
| R5, R6 | 22 Ω | — | — |
| U1 | — | LM2574N-005 | Motorola |
| U2, U6 | — | TPS2813D | Texas Instruments |
| U3 | — | A3144LU | Allegro |
| U4 | — | PIC12C508-04I/P | Microchip |
| U5 | — | MC33164P-3 | Motorola |

The power supply circuit 120 receives the alternating current supply voltage from the integral transformer 52 and provides a regulated 5 volt output 122. In this particular embodiment, power supply 120 comprises a bridge rectifier including diodes D1, D2, D5, and D6, capacitor C1, and resistor R1. The rectified signal is provided to a step-down voltage regulator 126 that, in conjunction with diode D4, inductor L1 and capacitor C2, regulates the output voltage to 5 V and filters unwanted frequency components of the regulated 5 V output 122. When the alternating current supply voltage is not applied to the transformer, the output 122 goes to 0 volts. An uninterrupted 5 volt output 128 is also provided which continues to supply power for approximately 4 seconds, depending upon the load, after the alternating current supply voltage is interrupted. This power is stored in capacitor C3 and when the supply power is interrupted the capacitor C3 provides a limited supply of current at the output 128. Diode D3 is provided to prevent capacitor D3 from being discharged by the power supply circuit 120.

The filter 140 prevents unwanted high-frequency components of the alternating current supply voltage applied to it from passing to the control circuit 160. The filter 140 comprises resistor R2 and capacitor C4 in a low-pass filter configuration. In addition, resistors R2 and R3 arranged in a voltage divider configuration reduce the voltage of the alternating current supply voltage passed to the control circuit 160.

The index point sensing circuit 180 comprises the magnetic sensor 34 and resistor R7. When the magnetic index point 40 on the color wheel 36 is aligned with the sensor 34, the sensor 34 outputs a logical "0" to input GP2 of the microcontroller 170; otherwise GP2 remains at 5 V. or logical "1". One of skill in the art will appreciate that resistor R7 is required for the present application of sensor 34 because sensor 34 has an open collector output. To this end, the resistor would normally connect the open collector output of sensor 34 to a positive 5 V supply to pull the output up. However, to prevent the sensor 34 from drawing power from microcontroller 170 when the alternating current supply voltage is interrupted, node GP1 on the microcontroller 170 is programmed to provide 5 V to the resistor R7 only when supply voltage is present.

The control circuit 160 comprises a reset circuit 162 and a microcontroller 170. Reset circuit 162 provides a reset signal on its output that assists in resetting the microcontroller 170 when the alternating current supply-voltage is initially applied to the light fixture 10. Reset circuit 162 comprises undervoltage sensor U5 and resistor R4.

The low-impedance output driver circuit 200 comprises two dual high-speed MOSFET drivers U2 and U6. The outputs of U2 and U6 are coupled to two coils, A and B, of the stepper motor 48 and provide sufficient current, in response to outputs from the microcontroller 170, for driving the motor 48. Power is provided to U2 and U6 from the 5 volt output 122.

Coupled to the reset circuit 162, the filter 140, and the driver circuit 200 is the microcontroller 170. The microcontroller 170 receives the reset signal provided by the reset circuit 162, the alternating current supply voltage filtered by the filter 140, and an index signal from the index point sensing circuit 180. In response to these inputs, the microcontroller 170 provides control signals at outputs GP4 and GP5 in the form of a grey code to driver circuit 200. The alternating current provided by filter 140 provides an input signal 190 for the microcontroller 170. The microcontroller 170 is preprogrammed to provide control signals according to the following scheme.

In the initial state of the synchronizer circuit 100 there is no alternating current applied from the transformer 52 and no current stored in capacitor C3. When power is applied, the microcontroller 170 is placed in "state 0" and no control signals are provided to the driver circuit 200, and thus the color wheel 36 remains stationary. To control the input signal 190, a user must interrupt power provided to the transformer 52. However, power must be reapplied within 4 seconds or capacitor C3 will completely discharge, bringing the 5 volt output 128 to 0 volts and causing the reset circuit 162 to return the microcontroller 170 to "state 0. " From "state 0, " when input signal 190 is sequentially interrupted and reengaged (within 4 seconds), the microcontroller 70 is advanced to "state 1."

Once placed in "state 1" the microcontroller 70 generates cycling outputs at GP4 and GP5 causing the driver circuit 200 to step the stepper motor 48 very quickly ("fast stepping") until the microcontroller 170 receives a logical "0" input from the sensing circuit 180. This positive input is caused by the alignment of the index point 40 with the magnetic sensor 34. Once they are aligned, the controller waits for a predetermined period of time, t, and then the microcontroller 170 advances to "state 2. " This predetermined period of time, t, allows any other lighting fixtures that are being synchronized using the same power source to become aligned, so that all of the lighting fixtures. The predetermined time, t, is selected in this embodiment to be twenty-one seconds, the time required for a full revolution of the color wheel during fast stepping of the motor 48, twenty seconds, plus an additional second to account for the possibility of error. This is the longest possible time it should take to return the color wheel to alignment of the index point 40 with the sensor 34.

In "state 2" the microcontroller generates slowly cycling outputs at GP4 and GP5 causing the driver circuit 200 to step the stepper motor 48 slowly (slow stepping), resulting in the color wheel 38 to rotate its color filters 42, 44 and 46 slowly past the lamps 18, which will allow a user time to view each hue produced and make a selection. This slow stepping continues indefinitely until the input signal 190 is interrupted. From "state 2, " when the input signal 190 is sequentially interrupted and reengaged (within 4 seconds), the microcontroller 170 returns to "state 0, " and the color wheel 38 stops rotating. In this way, a user can choose a desired hue of light and cause the light fixture to halt.

The following table summarizes the control scheme described above:

| State | Output | Wait for | and then |
|---|---|---|---|
| 0 | none (stopped) | "off" then "on" | go to "state 1" |
| 1 | fast stepping to index point and then stop | a predetermined period of time from last "on" | go to "state 2" |
| 2 | slow stepping | "off" then "on" | go to "state 0" |

As mentioned above, if at any time the power to transformer 52 is interrupted for longer than 4 seconds, the 5 volt output 128 will go to 0 volts and when reengaged, the microcontroller 170 will be reset to "state 0". Thus, a user may select a position for the color wheels of one or more lighting fixtures that produces a desired hue of light and then turn off the lights at the source. When the source power is restored, the color wheels will remain stationary and the light will remain the chosen hue. Likewise, an unintentional interruption of source power, such as a power outage, will not cause the selected hue to change.

It should be appreciated that multiple light fixtures will step at precisely the same rate as long as they are connected to the same source of power. This is because the microcontroller 170 generates output signals at GP4 and GP5 that step a grey code to the driver circuit 200 once for every N sine wave transitions of the alternating current supply voltage. N is a number determined by the microcontroller 170 depending upon how quickly the stepper motor 48 must be advanced. For fast stepping N=1, which causes the color wheel 36 to make one full rotation every twenty seconds. For slow stepping N=6, causing the color wheel 36 to make one full rotation in 120 seconds.

Further, when synchronizing multiple light fixtures, one fixture may become misaligned with respect to the others if it its power is independently interrupted for some reason or if there is mechanical slippage. For this reason, a master reference pulse is generated by the microcontroller 170 by counting the number of alternating current transitions (120 transitions per second for a 60 Hz supply) after current is initially applied and generating a pulse every 120 seconds or 14,400 transitions, which is the normal (slow stepping) full rotation period. To correct the synchronization, the master reference pulse is compared to an index pulse received from the sensor 34. The index pulse is generated every time the output of the sensor 34 is a logical "0", indicating that the magnetic index point 40 is aligned with the sensor 34.

If the master reference pulse is generated before the index pulse, then the microcontroller 170 determines that the color wheel 36 is lagging behind and the microcontroller 170 then begins to cause the motor to begin fast stepping until the index pulse is received from the sensor 34. Since the fast stepping is 6 times faster than the slow stepping, the lag time will then be reduced by a factor of 6 for every complete rotation of the color wheel 36.

If the index pulse is received before the master reference pulse is generated, then the microcontroller 170 determines that the color wheel 36 is ahead in its rotation and the microcontroller causes the color wheel 36 to stop rotating until the master reference pulse is generated. When the color wheel 36 resumes its rotation, it will be correctly aligned with the master reference pulse.

It should also be appreciated that, to conserve power, the sensor 34 and the driver circuit 200 are supplied power by 5 volt output 122, instead of output 128, so that when no power is being supplied by transformer 54 to power supply circuit 120, the sensor 34 and the driver circuit 200 do not unnecessarily draw power from the capacitor C3 and exhaust the limited supply of current from the capacitor C3 too quickly.

What is claimed is:

1. A method of controlling a motor operated by a control circuit comprising the steps of:

disconnecting power to an input of the control circuit;

reconnecting power to the input of the control circuit;

the control circuit controlling the motor to move a driven element at a first speed;

the control circuit stopping the motor when the driven element reaches an index position; and at a predetermined period of time after the step of reconnecting power, the control circuit controlling the motor to move the driven element at a second speed.

2. The method according to claim 1 where in the driven element is a color wheel in a lighting fixture.

3. The method according to claim 1 further comprising:

a second step of disconnecting power to the input of the control circuit;

a second step of reconnecting power to the input of the control circuit; and the control circuit stopping the motor after the second step of reconnecting power.

4. The method according to claim 1 wherein the first speed is faster then the second speed.

5. The method according to claim 1 wherein the power connected to the input of the control circuit is the power used to power the motor.

6. A method of operating a control circuit for a lighting fixture comprising the steps of:

disconnecting power to the control circuit;

reconnecting power to the control circuit;

the control circuit causing the lighting fixture to emit a predetermined color of light; and at a predetermined period of time after reconnecting the power, the control circuit controlling the lighting fixture to emit changing colors of light at a predetermined rate of change.

7. The method according to claim 6 further comprising:

a second step of disconnecting the power to the control circuit;

a second step of reconnecting the power to the control circuit; and the control circuit causing the lighting fixture to emit the color of light emitted when the second step of disconnecting power was performed.

8. A lighting fixture comprising of:

a lighting system; and a control circuit connected to control the lighting system wherein disconnecting and reconnecting power to an input of the control circuit a first time causes the lighting system to emit a predetermined color of light and then change the color of light emitted at a predetermined rate of change and further wherein disconnecting and reconnecting power to the input of the control circuit a second time causes the lighting system to emit the color of light emitted when the power was disconnected the second time.

9. An underwater lighting fixture adapted for installation in a lamp receiving recess in the wall of a swimming pool, said lighting fixture comprising:

a lamp housing having an interior cavity;

a plate mounted within said housing and being transverse to a longitudinal axis of said housing, said plate defining an opening;

a lamp having a reflector positioned at said opening on a first side of said plate so that said reflector is directed toward said open mouth;

a color wheel within said housing and mounted for rotation about said longitudinal axis, said color wheel having a plurality of dichroic radial filter segments, a driver mechanism for rotating said wheel, said color wheel sequentially positioning successive filter segments to the opening of said plate upon rotation of said wheel;

a transparent cover sealing the open mouth of said housing;

an electrical supply conduit extending through said lamp housing and into said interior cavity; and a fluid seal between said supply conduit and said lamp housing and a power transformer within the lamp housing.

10. The lighting fixture according to claim 9 wherein the lamp is positioned within the reflector.

11. The lighting fixture according to claim 9 wherein the plate defines a second opening and further comprising a second reflector positioned at said second opening on the first side of said plate so that said second reflector is directed toward said open mouth.

12. The lighting fixture according to claim 9 wherein said driver mechanism comprises a worm gear for transmission of power to the color wheel.

* * * * *